(12) United States Patent
Shechtman et al.

(10) Patent No.: US 10,089,764 B2
(45) Date of Patent: Oct. 2, 2018

(54) VARIABLE PATCH SHAPE SYNTHESIS

(71) Applicant: Adobe Systems Incorporated

(72) Inventors: Elya Shechtman, Seattle, WA (US);
Daniel R. Goldman, Seattle, WA (US);
Aliakbar Darabi, Albuquerque, NM (US); Nima Khademi Kalantari, Santa Barbara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 152 days.

(21) Appl. No.: 14/185,507

(22) Filed: Feb. 20, 2014

(65) Prior Publication Data

US 2015/0235399 A1    Aug. 20, 2015

(51) Int. Cl.
*G06T 11/60* (2006.01)
*G06T 5/00* (2006.01)

(52) U.S. Cl.
CPC .............. *G06T 11/60* (2013.01); *G06T 5/005* (2013.01)

(58) Field of Classification Search
None
See application file for complete search history.

(56) References Cited

U.S. PATENT DOCUMENTS

| | | | | |
|---|---|---|---|---|
| 8,249,365 B1 * | 8/2012 | Winnemoeller | ...... | G06T 11/001 382/181 |
| 8,355,592 B1 * | 1/2013 | Shechtman | .......... | G06T 3/0093 345/419 |
| 2010/0142846 A1 * | 6/2010 | Tolliver | .................. | G06T 7/11 382/274 |
| 2010/0177955 A1 * | 7/2010 | Simakov | .......... | G06F 17/30843 382/154 |
| 2014/0169700 A1 * | 6/2014 | Liu | .......................... | G06K 9/32 382/294 |
| 2015/0138405 A1 * | 5/2015 | Donohoe | ................ | G06T 5/002 348/246 |

OTHER PUBLICATIONS

Anitha Kannan, JohnWinn, Carsten Rother, "Clustering appearance and shape by learning jigsaws", Microsfot, 2009.*
Pradeep Sen, Nima Khademi Kalantari, Maziar Yaesoubi, Soheil Darabi, Dan B Goldman, Eli Shechtman, "Robust Patch-Based HDR Reconstruction of Dynamic Scenes", University of California, Santa Barbara, UNM, Adobe, 2009.*
Deqing Sun, Erik Sudderth, Michael Black, "Layered segmentation and optical flow estimation over time", Brown University, Max Planck Institute for Intelligent Systems, 2012.*

(Continued)

*Primary Examiner* — Said Broome
*Assistant Examiner* — YuJang Tswei
(74) *Attorney, Agent, or Firm* — Wolfe-SBMC

(57) ABSTRACT

Variable patch shape synthesis techniques are described. In one or more implementations, a plurality of patches are computed from one or more images, at least one of the plurality of patches having a different shape than another one of the plurality of patches. The shapes define an area to be considered for use in a patch synthesis technique. The patch synthesis technique is performed to edit an image using the computed plurality of patches having the different shapes.

18 Claims, 12 Drawing Sheets

(56) References Cited

OTHER PUBLICATIONS

"Photoshop CS5 Content-Aware Fill", Retrieved at <<http://www.adobe.com/technology/projects/content-aware-fill.html>> on Dec. 16, 2013, 2010, 2 pages.
Barnes, et al., "PatchMatch: A Randomized Correspondence Algorithm for Structural Image Editing", ACM SIGGRAPH 2009 Papers (New Orleans, Louisiana, Aug. 3-7, 2009), Aug. 3, 2009, 11 pages.
Darabi, et al., "Image Melding: Combining inconsistent images using patch-based synthesis", ACM Transactions on Graphics (TOG) (Proceedings of SIGGRAPH 2012), 31(4):82:1-82:10, 2012., Jul. 2012, 10 pages.
Drori, et al., "Fragment-Based Image Completion", Proceedings of ACM SIGGRAPH, pp. 303-312, 2003, 10 pages.
Hoiem, et al., "Recovering Occlusion Boundaries from an Image", Int. J. Comput. Vision 91, 3 (Feb. 2011)., Feb. 2011, 8 pages.

\* cited by examiner

1100 —↘

1102
Compute a plurality of patches from one or more images, at least one of the plurality of patches having a different shape than another one of the plurality of patches, the shapes defining an area to be considered for use in a patch synthesis technique

↓

1104
Perform the patch synthesis technique to edit an image using the computed plurality of patches having the different shape

VARIABLE PATCH SHAPE SYNTHESIS

BACKGROUND

Image editing techniques are becoming increasingly popular as the pervasiveness of image capture devices continues to increase. A user, for instance, may carry a mobile phone having a digital camera, a tablet computer, dedicated camera, and so on to capture an image of an image scene. A user may then employ image editing techniques to modify the image as desired.

One such example of an editing technique involves patch synthesis which may be utilized to synthesize portions of an image based on patches taken from other portions of the image and/or patches taken from other images. This may be utilized to support a variety of different techniques, such as hole filling, retargeting, morphing, and so on.

However, conventional techniques that were employed to perform patch synthesis involved use of patches having fixed shapes. Accordingly, these conventional techniques could be limited in instances in which the available patches do not accurately represent the portion to be synthesized due to limitations on the shape of the patch.

SUMMARY

Variable patch shape synthesis techniques are described. In one or more implementations, a plurality of patches are computed from one or more images, at least one of the plurality of patches having a different shape than another one of the plurality of patches. The shapes define an area to be considered for use in a patch synthesis technique. The patch synthesis technique is performed to edit an image using the computed plurality of patches having the different shapes.

In one or more implementations, a patch search is performed for each of a plurality of masks to calculate a corresponding plurality of nearest neighbor fields (NNFs). The plurality of masks and corresponding nearest neighbor fields are selected for each pixel in a target image and the selected masks and the corresponding nearest neighbor fields are used in a voting process as part of a patch synthesis technique for the target image.

In one or more implementations, a system includes one or more computing devices configured to perform operations that include computing a plurality of patches from one or more images, at least one of the plurality of patches having a different shape than another one of the plurality of patches as defined by respective ones of a plurality of masks and performing a patch synthesis technique to edit an image using the shapes of the plurality of patches as defined by the respective masks.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 11 is a flow diagram depicting a procedure in an example implementation in which variable shapes of patches are used as part of a patch synthesis image editing technique.

DETAILED DESCRIPTION

Overview

Patch-based synthesis is a powerful tool for different image and video editing applications such as hole-filling, retargeting, morphing, and so forth. Patch-based synthesis may also be incorporated as part of content aware features that may be found in image editing applications such as "fill," "patch and move tools," and so on. Each of these features is based on optimization of an objective function through a patch search and vote process to find patches that are to be used as part of the synthesis, e.g., to "fill the hole" based on patches taken from the image or another image.

Conventional techniques typically use square image patches and thus had a fixed shape. Consequently, these conventional techniques may have a fundamental limitation based on this fixed shape, e.g., when confronted with multiple depth layers. For example, patches along an edge of a foreground layer may overlap with a background in an image and therefore it may be difficult to synthesize new combinations of foregrounds and backgrounds for the image using the patches having the fixed shape, such as at a border of a slanted object in a foreground of an image.

Accordingly, techniques are described in the following in which patches may have variable shapes that are usable as part of patch-based synthesis. The variable shapes may be formed in a variety of ways, such as through use of content adaptive masks. The masks may also be defined in a variety of ways, such as based on local features extracted around the patch using a heuristic set of rules, rules learned from a dataset of "good" synthesis results, and so on. Further discussion of configuration and use of patches having variable shapes for use as part of patch-based synthesis image editing techniques may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
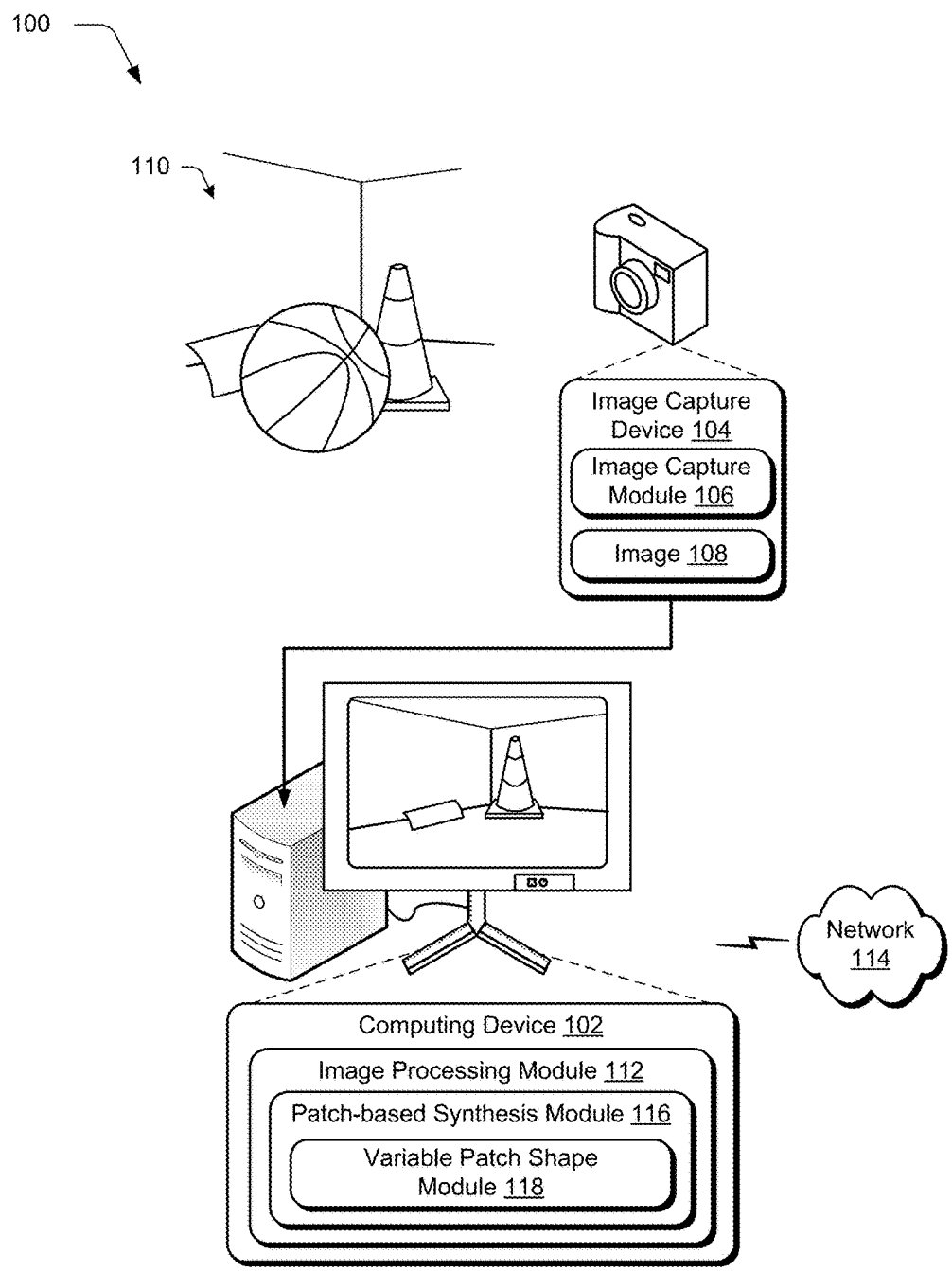
FIG. 1 is an illustration of an environment in an example implementation that is operable to employ techniques described herein involving variable patch shape synthesis.

FIG. 1 is an illustration of an environment 100 in an example implementation that is operable to employ techniques described herein. The illustrated environment 100 includes a computing device 102 and an image capture device 104, both of which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 13.

The image capture device 104 may also be configured in a variety of ways. The illustrated examples includes a standalone camera as a dedicated device both other examples are also contemplated, such as part of a mobile phone or tablet and thus may be incorporated as part of the computing device 102 itself. The image capture device 104 is illustrated as including an image capture module 106. The image capture module 106 is representative of functionality to capture one or more images 108 of an image scene 110, such as by including image sensors and other hardware and software components to capture, process, and/or store images 108.

The computing device 102 is illustrated as including an image processing module 112. The image processing module 112 is representative of functionality to perform one or more techniques that are usable to process an image. Although illustrated as implemented locally on the computing device, functionality of the image processing module 112 may also be implemented in a distributed environment, remotely via a network 114 (e.g., "over the cloud") as further described in relation to FIG. 13, and so on.

An example of image processing that may be performed by the image processing module 112 is represented as a patch-based synthesis module 116. The patch-based synthesis module 116 is representative of functionality to utilize patches taken from an image or other images to synthesize a portion of an image, such as to support hole-filling, retargeting, morphing, and so forth. For example, as illustrated the image scene 110 includes a basketball, a cone, and a piece of paper. The patch-based synthesis module 116 may be used to fill a target region in the image 108 through use of patches, such as to support object removal to remove the basketball from the image 108 as shown in the user interface output by the display device of the computing device 102 in the figure.

Patch-based synthesis may be utilized for a variety of synthesis techniques, including image-based rendering, hole-filling, texture synthesis, retargeting and reshuffling, super resolution, morphing, image compositing and interpolation, video summarization, high dynamic range (HDR) reconstruction, and so on. These techniques are based on optimizing a patch-based objective function through a multi-scale patch search-and-vote process. During the search step, for each patch in the region to be synthesized (e.g., the "hole" in the hole-filling application) a similar patch is found from the available examples (regions outside the hole) which may include the image itself and/or another image. The retrieved patches are averaged in the voting step to obtain a new color estimate for each unknown pixel based on a weight assigned to the patches of a relative likelihood of correctness of the patch.

Conventional patch-based techniques use fixed-size square patches which has an inherent limitation when a patch covers multiple regions and the available patch examples containing the same layout of the different regions are scarce or do not exist at all. In these cases, use of a portion of the patch (and not another portion of the patch) may lead to discovery of examples have increased relevance and thus achieve better synthesis results.

Figure 2:
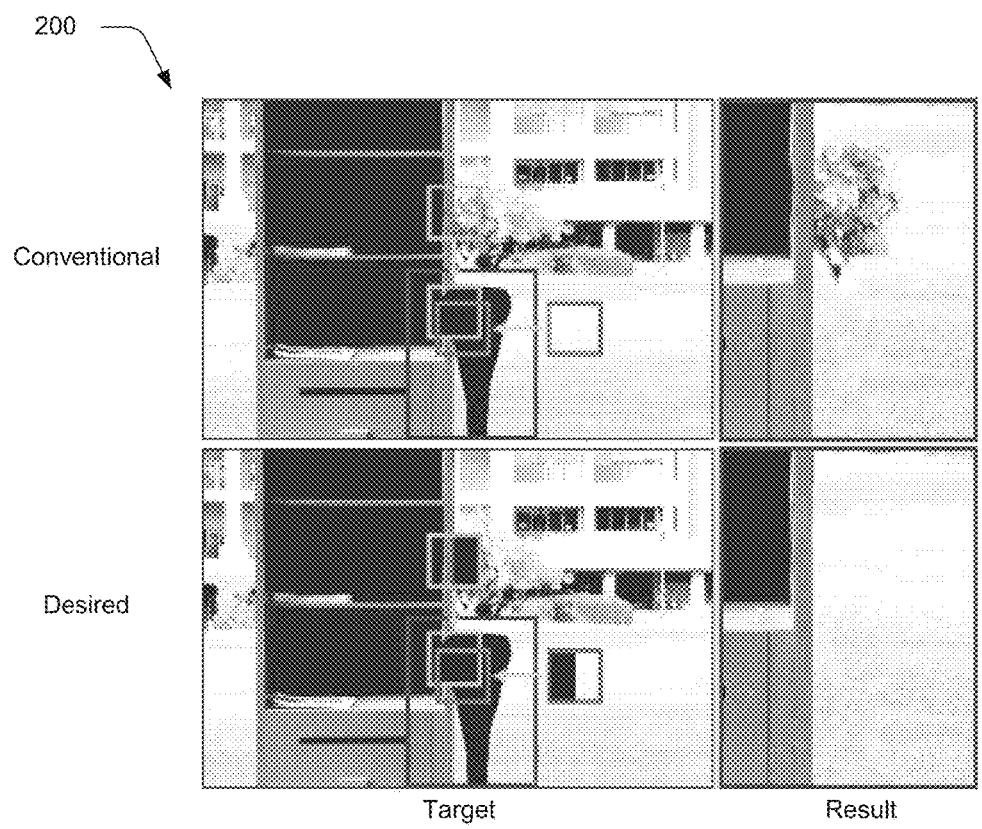
FIG. 2 depicts an example implementation showing selection of patches for a target region.

An example 200 of this problem is shown in FIG. 2. As illustrated, the top row shows a conventional hole-filling technique. For the patches shown, just a portion of each patch is similar to the correct content of the hole. Therefore, use of the entire patch as part of a conventional patch synthesis technique may produce unacceptable results. This may become even more problematic in hole-filling techniques that leverage other photos of the same scene captured from different views and/or at different times to supply patches. In this case, the input data may contain parallax between objects at different depth layers and the patches covering two objects at different depths might not be similar across the inputs.

A similar issue occurs in related problems such as optical flow, stereo, and image matching. In optical flow estimation, this problem is usually handled by optimizing for the flow and depth layer segments simultaneously and involves use of multiple inputs. Although segmentation may be taken into account for computing image matches, such segmentation cannot be computed in a similar way for a "to be synthesized" region (e.g., the "hole" in hole-filling) since its content is a priori unknown.

Accordingly, a variable patch shape module 118 of FIG. 1 may be utilized which is representative of functionality to leverage use of patches having variable shapes as part of patch synthesis. This may be performed in a variety of different ways, such as through use of content adaptive masks. By choosing an appropriate mask for a patch during the search-and-vote process by the variable patch shape module 118, the distance of a patch portion where the information is not valid may be given a decreased weight, i.e., down weighted. A model may be learned from a set of good synthesis results and used to predict a proper mask per patch from a set of features extracted in a vicinity of the patch. The following description includes examples of results of this technique and describes examples of improvements over conventional patch-based techniques having fixed shapes.

Explanation of the Problem

Return will now be made again to FIG. 2, in which a user defines a region in an image which divides it into target "T" (e.g., a box bounding a hole shown in the figure of a foreground object) and source region "S" of an area outside of this bounding box. In this example, a missing target region is to be completed from the source region. This may be performed by minimizing an objective function which has the following patch-based energy term:

$$\text{Coherence}(T, S) = \frac{1}{|T|} \sum_{Q \in T} \min_{P \in S} D(Q, P). \quad (1)$$

where "P" and "Q" are patches of size "w×w" in the source and target images, respectively, and "D" is defined as the "$\mathcal{L}_2$" distance between these two patches, which is typically weighted equally for each of the pixels. This objective function may be minimized by a "search" and "vote" iterative process as follows.

To perform a search, for each patch in the target image, the most similar patch in the source image is found. To vote, for each pixel in the target image, each of the overlapping patches found in the previous stage may be averaged to obtain a color for a next iteration. To avoid local minimum, the optimization may be performed in a coarse-to-fine fashion. Starting from the coarsest scale, for instance, at each scale the search-and-vote process is performed iteratively until convergence. The converged target is then up sampled and used at a finer scale. This process continues until convergence is reached at the finest scale supported.

The top row of FIG. 2 illustrates an example 200 of the problem with conventional patch-based techniques. As illustrated, the image does not contain a comparable full patch in the source region (e.g., the squares "outside" the box with leading arrows) for the patches (e.g., squares to which the arrows points) in the target region. This problem has increased severity at coarser scales where patches are large and therefore the chance of covering multiple regions is higher. Additionally, convergence to a bad solution at coarse scales often cannot be fixed at finer scales, thus leading to bad results overall as shown at the top row of FIG. 2.

Figure 3:
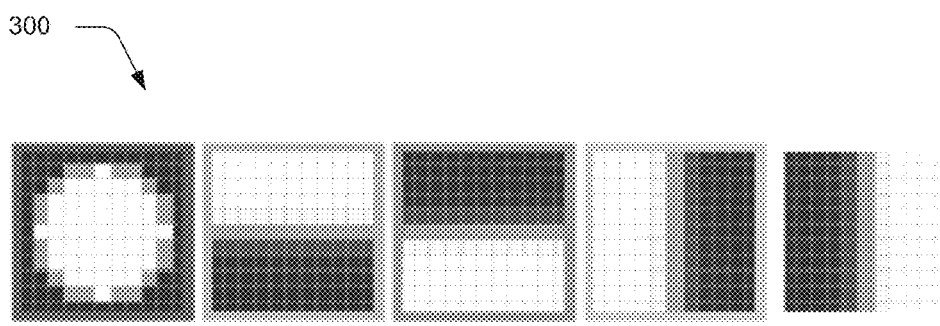
FIG. 3 depicts an example implementation of predefined masks that may be utilized to define variable patch shapes.

FIG. 3 depicts an example implementation 300 of masks for patches that may be employed by the variable patch shape module 118 of FIG. 1 to generate variable patch shapes. The example implementation 300 includes five different masks "$\mathcal{M}$" that in this instance are normalized such that together the masks sum to one. The left most mask may be referred to as a center mask and the rest are non-center masks.

The masks are configured for use as part of the variable patch shape module 118 to down-weight a portion of a patch that has irrelevant content and thus solely take into account the portion of the patch that is considered useful for patch synthesis. To do this, a distance function "D" may be modified in the following way:

$$D(Q, P) = \sum_{i=1}^{w^2} m(i)(Q(i) - P(i))^2, \quad (2)$$

where "w" is the patch width, and "m" is a mask that weights the distance between source and target patches at each pixel belongs to a large "$w^2$"-dimensional masks set "$\mathcal{M}$." To reflect this modification in the voting process, the overlapping patches are averaged and weighted by corresponding mask values.

In some instances, choosing a correct mask from a large set "$\mathcal{M}$" of masks for each patch may be difficult. Accordingly, to make the problem more tractable, the set "$\mathcal{M}$" of patches may be limited to a relatively small number of pre-defined masks, "$m_0, m_1, \ldots, m\mathcal{M}$," an example 300 of which is shown in FIG. 3.

A patch search process for each mask in this set may be performed which results in "M" nearest neighbor fields (NNF). Then, for each pixel in the target image, one of the "$\mathcal{M}$" masks may be selected. The mask and its corresponding nearest neighbor field (NNF) may then be used for voting.

Figure 4:
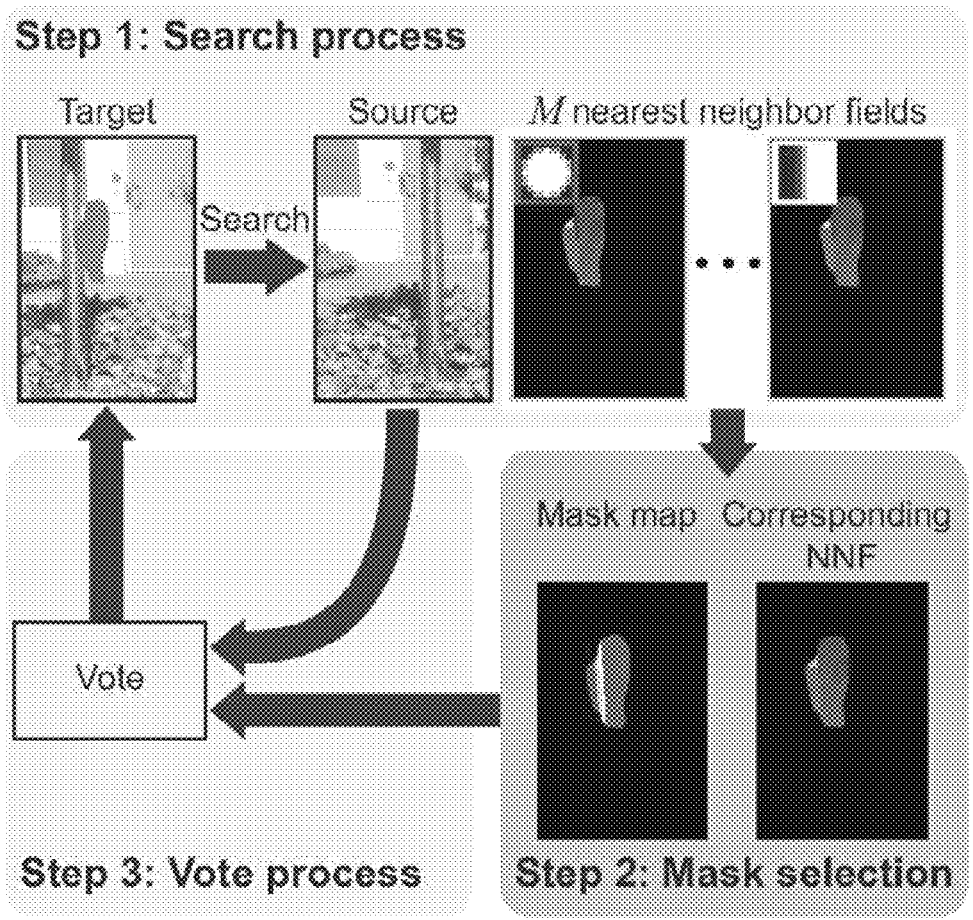
FIG. 4 depicts an example system showing a framework that may be utilized as part of a search and vote process.

FIG. 4 depicts an example system 400 of that leverages use of variable patches for patch synthesis. The illustrated system 400 shows an example of hole filling, although other image processing techniques may also utilize this functionality as previously described. At a first step, a patch search is performed for each mask in the set "$\mathcal{M}$," which result in "M" nearest neighbor fields (NNFs). An appropriate mask and its corresponding NNF is selected for each pixel in the target image. The computed values are then used as part of a voting process in the third step.

Figure 5:
FIG. 5 depicts an example implementation of two images taken from different points of view and a hole region defined in one of the images along with examples of masks usable as part of patches to define valid regions of the patches.

FIG. 5 depicts an example implementation 500 of selection of a mask for use in patch synthesis. In this illustrated example, two images are taken from different points of view, respectively, and a hole region is defined in one of the images, e.g., the left image in the first step. The squares show two patches with their appropriate masks. In this example, depth discontinuity is used as a clue to determine which mask is the set of masks is to be selected. One of the challenges in use of a mask as part of patch synthesis is to choose which mask in the set of masks is to be used at each pixel. The may be performed in a variety of ways, such as through machine learning, a manual process, and so on as further described below.

If a semantic segmentation of the image is available, the mask may be defined simply as the part of the patch that belongs to a single region. As shown in the hole filling example in FIG. 5, for instance, since the tree is moving in front of a background in the two images, the tree and background may be defined as two different segments and therefore the masks may be defined according to that segmentation. Computation of such a segmentation may employ human interaction, e.g., through output of a user interface via which a user may define the segmentation.

In another example, a model may be learned using machine learning and used to select a mask from a set of "M" possible masks. The prediction may be performed by using the target patch and the "M" matching source patches, each found using the corresponding nearest neighbor field (NNF). Such a model may depend on a variety of different factors such as the cues for depth discontinuity within the target and source patches as shown in FIG. 5, incoherency of the NNF and the target-to-source patch distances (absolute and relative), and so forth.

The model may also be learned from data generated by a successful patch-based synthesis process that makes use of masked patches. The training data, for instance, may include features extracted from target and matched source patches as well the corresponding "ground truth" masks that led to successful synthesis in the end of the process. That means for each set of features, there is a ground truth mask which is one of the "M" pre-defined masks. This is a classification problem which can be done with algorithms, e.g., a random forest algorithm.

Training data may be simulated in a variety of ways, such as by using a by-example hole-filling application in which a hole in a target image that contains multiple depth layers is filled, and where another image captured from another view/time is given and is used as a source. In this case, the missing data in the target exists in the source and thus plausibility of the fill may be easily verified by a user.

Ground truth masks may then be generated for each training set. As shown in FIG. 5, for instance, two images are taken from different viewpoints and a region is defined in one of the images as a "hole." Masks may then be chosen according to the depth discontinuity in the images. For example, for the patch which is on the left side of the tree at the top, a mask that down-weights the right side of the patch is considered the "best" and vice versa for the patch at the bottom. Based on this observation, for a set of source and target images the depth discontinuity boundary on the target image may be drawn as shown in the example 600 of FIG. 6. Note that on these training images, access may be obtained to the original image and therefore it is known "what should be behind" the hole. The boundary may then be converted to a mask map using the following patch-based process.

Figure 6:
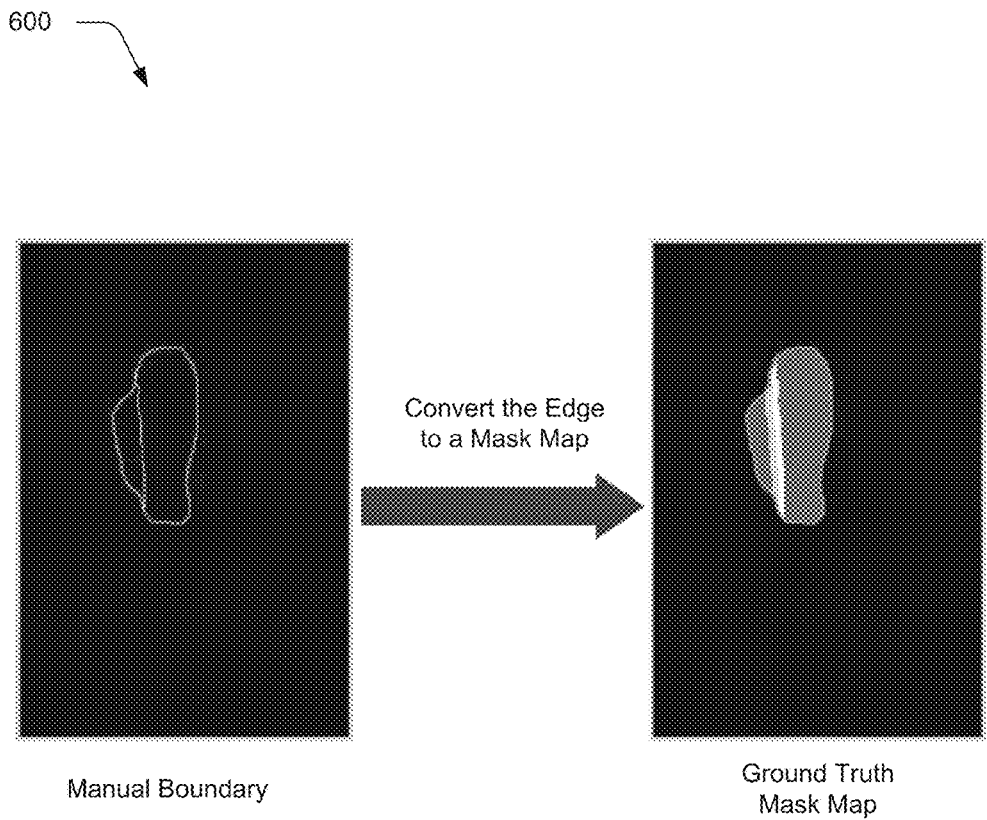
FIG. 6 depicts an example system in which an edge in a manual boundary is converted to a ground truth mask map.
Figure 7:
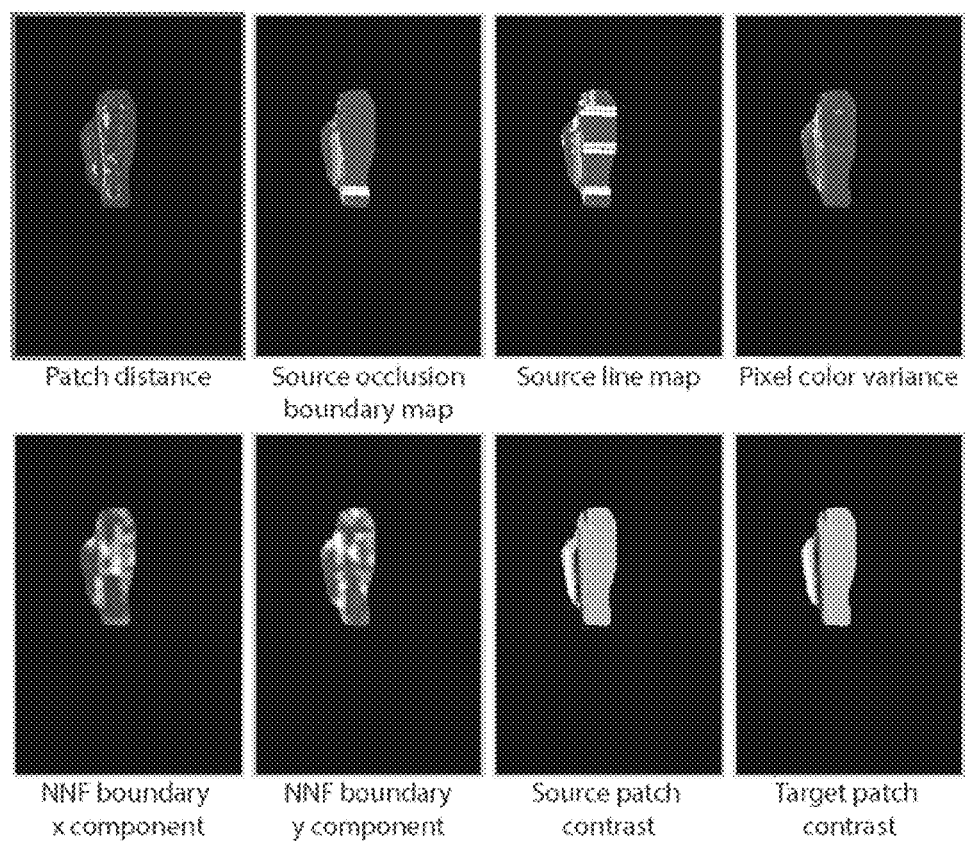
FIG. 7 depicts an example implementation of features usable in a learning system.

In the process shown in FIG. 6, an edge image is converted to a mask map that defines which mask is to be used at each pixel, as shown in the right side image in FIG. 6. Intuitively, for the pixels where a patch centered on it does not have overlap with an edge, a non-center mask may be the best choice. For the patches overlapping an edge, if the edge falls on the left side of the patch, the best choice is a mask that down-weights the left side. To do this, the following score may be computed for each non-center mask:

$$\text{score}_j = \frac{\sum_{i=1}^{w^2}(1-m_j(i))E(i)}{\sum_{i=1}^{w^2}E(i)}, \quad (3)$$

where "E" is a patch on the edge image and "j" is from "2 to M." The mask with the maximum score is then determined and if its score is above a threshold (e.g., 0.7) that mask is assigned, otherwise the center mask is assigned.

In the example 600 of FIG. 6, the depth discontinuity is manually drawn on the target image through interaction with a user interface. This boundary is then converted to a mask map which is used as ground truth mask map. The manual boundary and mask map serve as the dataset in FIG. 5.

The computed mask map is used as the ground truth mask and is used in the hole-filling process which is done in multiple scales. A set of features are extracted at each iteration in each scale and the ground truth masks are used as the target labels. A random forest method is then used to learn a model given the input features and corresponding ground truth masks.

In the above discussion, a process has been described for learning a model from the features extracted from good synthesized images. Although the model has high accuracy in predicting the masks, it may not function optimally in each instance. For example, when using the model in the actual hole-filling process, due to the iterative nature of the optimization and possible inaccuracies in the model, it is possible to diverge from the good solution. Since the model is trained solely on the positive examples, it cannot predict a reliable mask from the features extracted from the diverged images.

Accordingly, divergence may be simulated and the features extracted from the diverged images included in the training data to address this possible challenge. Training a model on the features extracted from diverged images as well as the ones extracted from good synthesis may result in a model having increased robustness and which can predict reliable mask in both cases. To do so, once a model is computed using the process explained above, the process may be repeated with a key difference. At each iteration, instead of extracting the features from the current good image, a search-and-vote may be performed using the masks predicted by the current model for one or more iterations. The features may then be extracted from the diverged images and included in the training data. Learning a model from these features as well as the features from good synthesized images may thus be used to ensure robustness.

Good features are extracted in order to learn a reliable model. In the following, an example list of features is explained that are used in the learning system, a summary of them can be found in the following table.

| Feature name | Number of features |
|---|---|
| Patch distance | M − 1 |
| Source occlusion boundary map | M − 1 |
| Source line map | M − 1 |
| Pixel color variance | 1 |
| Nearest neighbor field boundaries | 2M |
| Source patch contrast | M − 1 |
| Target patch contrast | M − 1 |
| Scale index | 1 |

The features that are defined on the source image are mapped to the target image using all or some of the "M" nearest neighbor fields (NNFs) that are computed in the search process. Note that the process may be performed in the "L*a*b*" color space although other examples are also contemplated.

For patch distance, a distance is computed between the target and its corresponding source patch using Equation (2) above for the nearest neighbor fields "2 to M" and are normalized by the distance of the center mask. Although in some instances it may be considered that the mask that gives minimum patch distance is the best choice, it has also been observed that such an optimization may converge to bad synthesized results in some instances.

For a source occlusion boundary map, techniques are utilized to extract occlusion boundaries. These are the edges that typically define the depth discontinuities. The extracted edges may be transformed to a feature having increased usefulness by being converted to a mask map as explained above. This mask map is defined on the source image and mapped to the target using the nearest neighbor fields "2 through M," each of which is a non-center mask in this example. This features defines depth discontinuities and as discussed above may be used to indicate regions in which masking is to occur.

For a source line map, the lines in source image are extracted and converted to a mask map. The mask map is then mapped to the target using the nearest neighbor fields "2 to M." In the cases in which an occlusion boundary fails, this feature may be helpful by detecting the boundaries with strong lines.

For pixel color variance, in order to measure the consistency of the overlapping patches at each pixel, the variance of the pixel values is computed from each of the source overlapping patches at that pixel. This variance is computed solely for the center mask, since this features measures the consistency of patches. Whenever the patches are consistent, this variance is generally low and thus serves as a good guide of whether to use the center mask. In the places that this variance is large, it shows that the patches are not consistent and therefore non-center masks are better choices. The variance for each channel is computed separately and the maximum of the three found, which may be used as a penalty.

For nearest neighbor field boundaries, discontinuities in the nearest neighbor field are calculated. It has been observed that in the regions that the nearest neighbor field is coherent, non-center masks are not used and the masking is most useful in the regions in which there is discontinuity in the nearest neighbor field. To do this, the amplitude of the gradient of "M" nearest neighbor fields is computed for the "x" and "y" components. The small gradients are then set to zero and the gradient having the applied threshold is filtered with a Gaussian filter.

For source patch contrast, the normalized contrast of the source patch may be computed as follows:

$$c_s = \frac{\sum_{i=1}^{w^2} m(i)Q(i) - \sum_{i=1}^{w^2} (1-m(i))Q(i)}{\sum_{i=1}^{w^2} Q(i)}. \quad (4)$$

Note, that the contrast is computed solely for the luminance channel in this example. The contrast of the target patch may also be computed for the luminance channel using Equation (4) above.

The index of the scale describes a feature in which the search and vote is happens. Since a single model is learned for each of the scales, this feature is relevant so that each scale can be trained according to its specific properties.

Examples of Results

In this example, ten pairs of images are used as a training set, containing mostly vertical depth discontinuities. To train the system symmetrically and also to learn for horizontal depth discontinuities vertically flipped, 90 degree rotated and rotated and flipped versions of the images are added to the training (40 pairs in total). Moreover, since the ground truth mask maps contain mostly center masks (see FIG. 6), to avoid over fitting half of the training data are chosen from center masks and the other half are chosen from non-center masks. A patch match technique may be utilized to accelerate the search process. The patch width "w" was equal to 11 in all cases, and the histogram of patch weights in each mask is identical.

Figure 8:
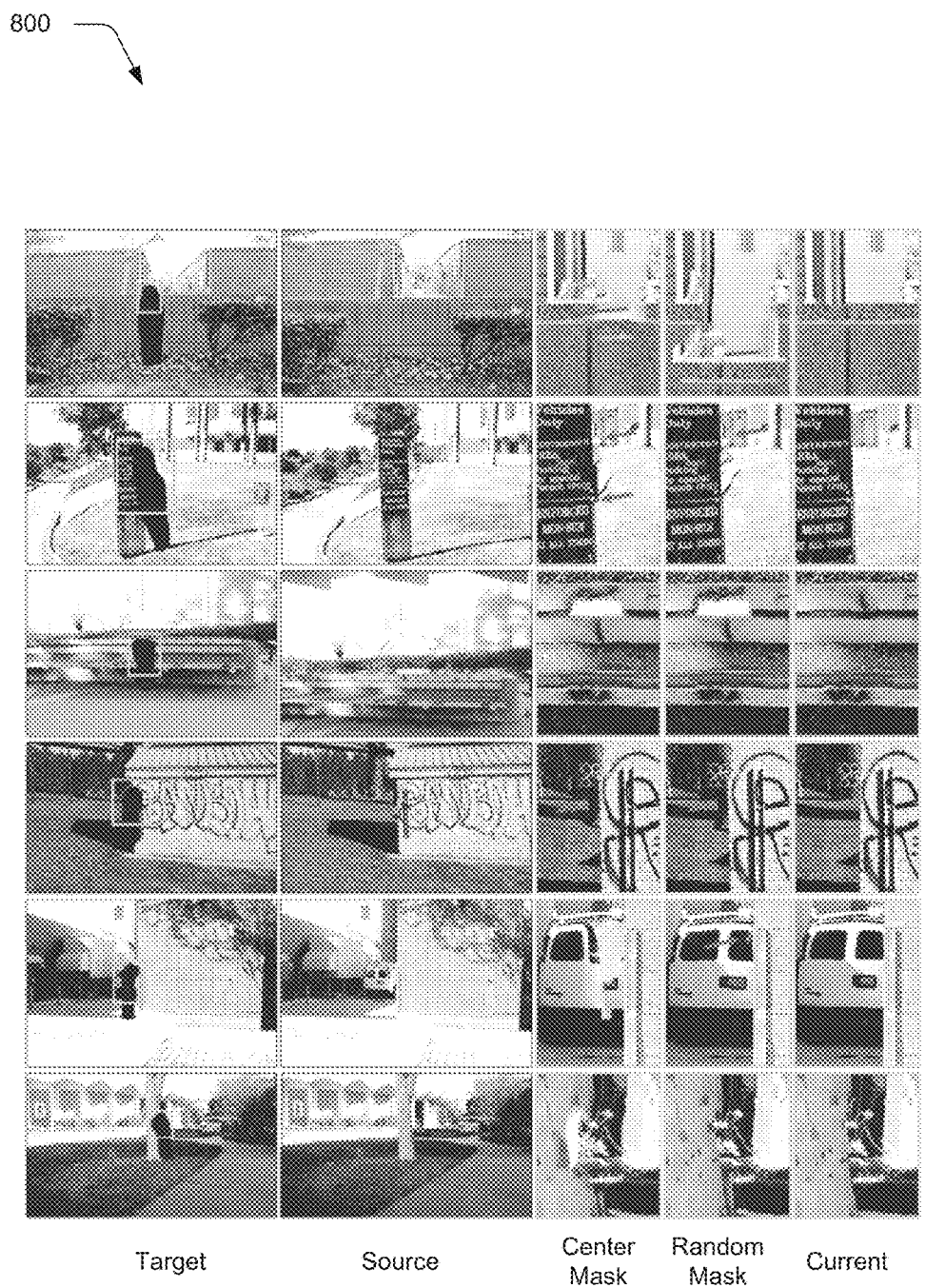
FIG. 8 depicts an example implementation showing a comparison of currently described techniques against conventional patch-based techniques.

The techniques described herein are first compared against regular patch-based synthesis on the by-example hole-filling application an example 800 shown in FIG. 8. As seen in each of the examples, the regular patch-based technique exhibits difficulties around the depth discontinuities which results in broken edges and other artifacts. The current technique, however, produces plausible results with minimal artifacts.

Figure 9:
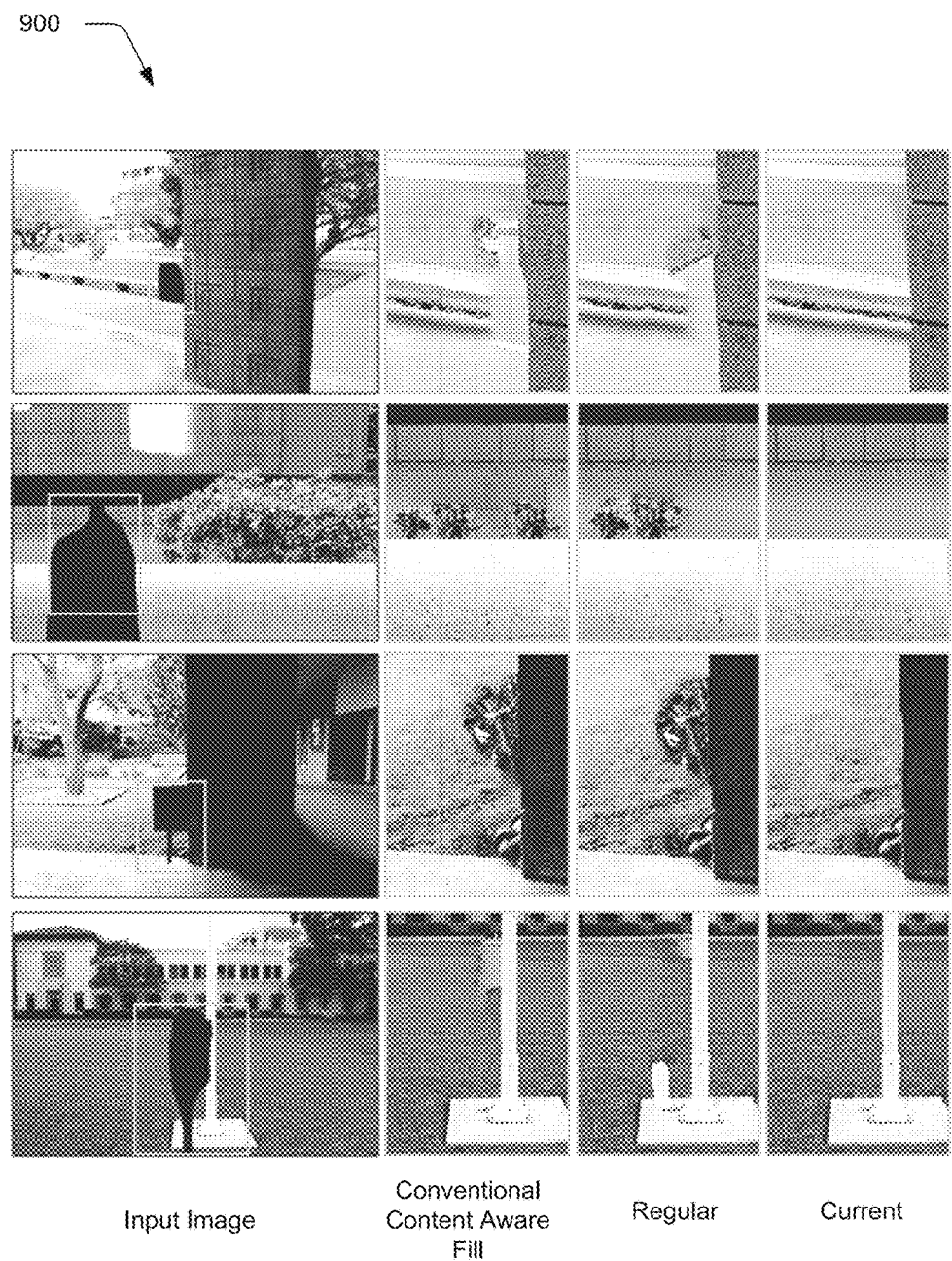
FIG. 9 depicts an example implementation showing a comparison of currently described techniques against conventional patch-based techniques involving single image hole filling.
Figure 10:
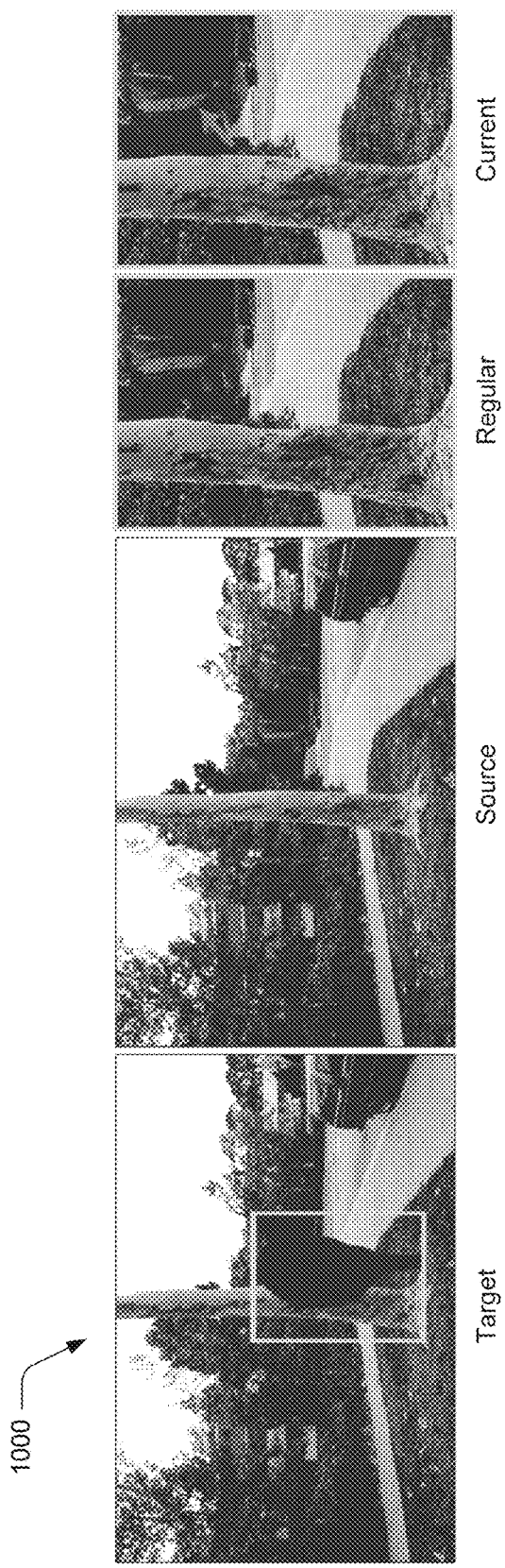
FIG. 10 depicts an example implementation showing a comparison involving a plurality of depth layers.

Next, the learned model is used and tested on a single image hole-filling application as shown in an example 900 depicted in FIG. 9. In this figure, current results are compared with regular hole-filling, the current example using a center mask, solely, as part of a content aware fill image editing operation. As can be seen the current technique generates plausible results, while the others contain artifacts.

Although in the above discussion the solution described was specific for patch-based techniques, the solution described herein may also be employed for other image editing techniques, such as Shift-Map. In shift-map, the gradient filters at coarse scales may capture a mixture of different depth layers and the simple neighborhood term in its objective function may not be sensitive enough to separate them. Accordingly, a similar learning based approach may be applied to other image and video editing techniques.

Techniques have been described that address a common problem of conventional patch-based techniques where patches cover multiple regions. Masks are used in examples for down-weighting some parts of a patch and while leaving other parts available for use as part of a search and vote process in the inner loop of the synthesis algorithm. Prediction of accurate masks may employ a variety of factors and a learning approach that uses a dataset of good synthesis data may be leveraged to predict a reliable mask. Further discussion of these techniques may be found in relation to the following procedures.

Example Procedures

The following discussion describes variable patch shape synthesis techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-10.

FIG. 11 depicts a procedure 1100 in an example implementation in which variable shapes of patches are used as part of a patch synthesis image editing technique. A plurality of patches are computed from one or more images, at least one of the plurality of patches having a different shape than another one of the plurality of patches. The shapes define an area to be considered for use in a patch synthesis technique (block 1102). The shapes, for instance, may define which parts of a patch are and are not appropriate for use as part of a patch synthesis technique. The shapes may be defined in a variety of ways, such as through use of a mask as shown in FIG. 3.

The patch synthesis technique is used to edit an image using the computed plurality of patches having the different shapes (block 1104). A variety of different techniques may be employed, such as a search and voting techniques as described above. Also, these techniques may be utilized to support a variety of different functionality, such as image-based rendering, hole-filling, texture synthesis, retargeting and reshuffling, super resolution, morphing, image compositing and interpolation, video summarization, and HDR reconstruction.

Figure 12:
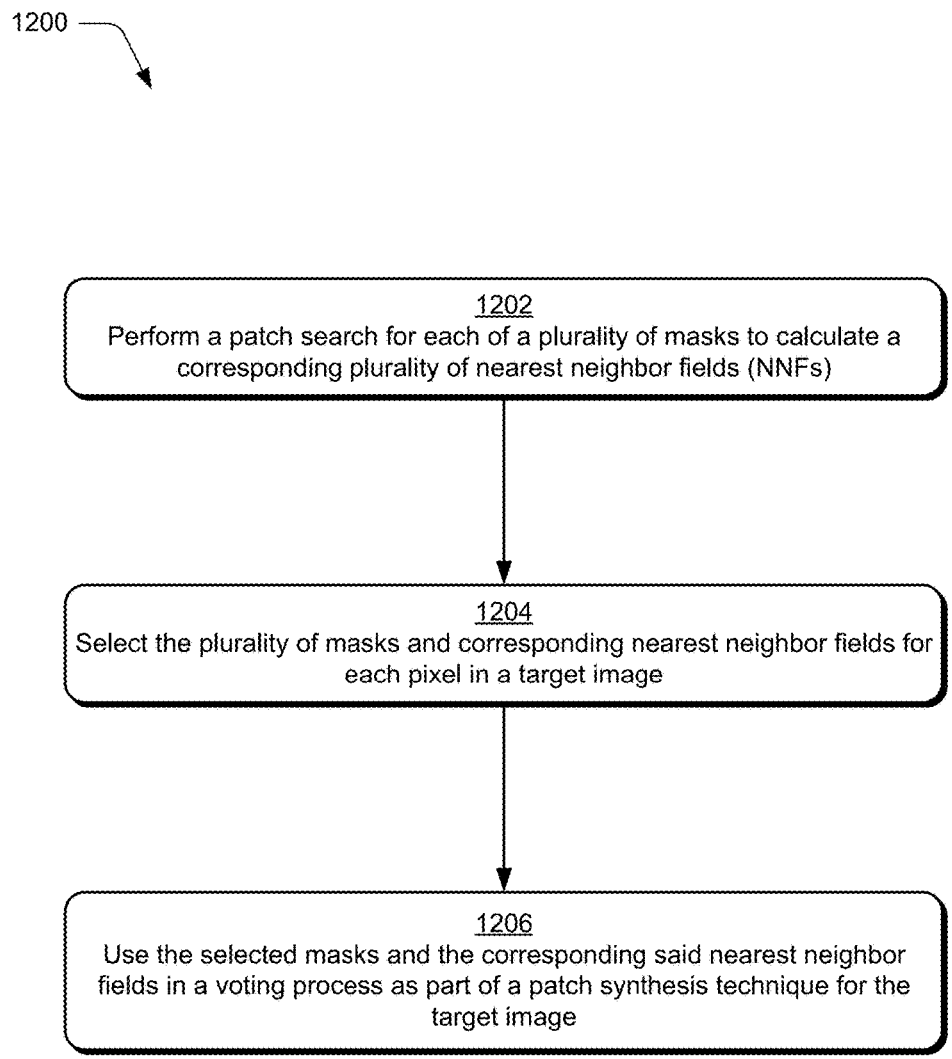
FIG. 12 is a flow diagram depicting a procedure in an example implementation in which a search and voting process using variable patch shapes for a patch synthesis techniques is described.

FIG. 12 depicts a procedure 1200 in an example implementation in which a search and voting process using variable patch shapes for a patch synthesis techniques is described. A patch search is performed for each of a plurality of masks to calculate a corresponding plurality of nearest neighbor fields (NNFs) (block 1202). The plurality of masks and corresponding nearest neighbor fields are then selected for each pixel in a target image (block 1204). The selection, for instance, may be performed for one of the masks shown in FIG. 3 as part of the system shown in FIG. 4.

The selected masks and corresponding nearest neighbor fields are used in a voting process as part of a patch synthesis technique for the target image (block 1206). Continuing with the previous example, the framework shown for the variable patch shape module 118 may be utilized as part of patched-base synthesis as part of a voting process to perform patch synthesis. As above, a variety of different patch synthesis techniques may be performed, such as image-based rendering, hole-filling, texture synthesis, retargeting and reshuffling, super resolution, morphing, image compositing and interpolation, video summarization, and HDR reconstruction.

Example System and Device

Figure 13:
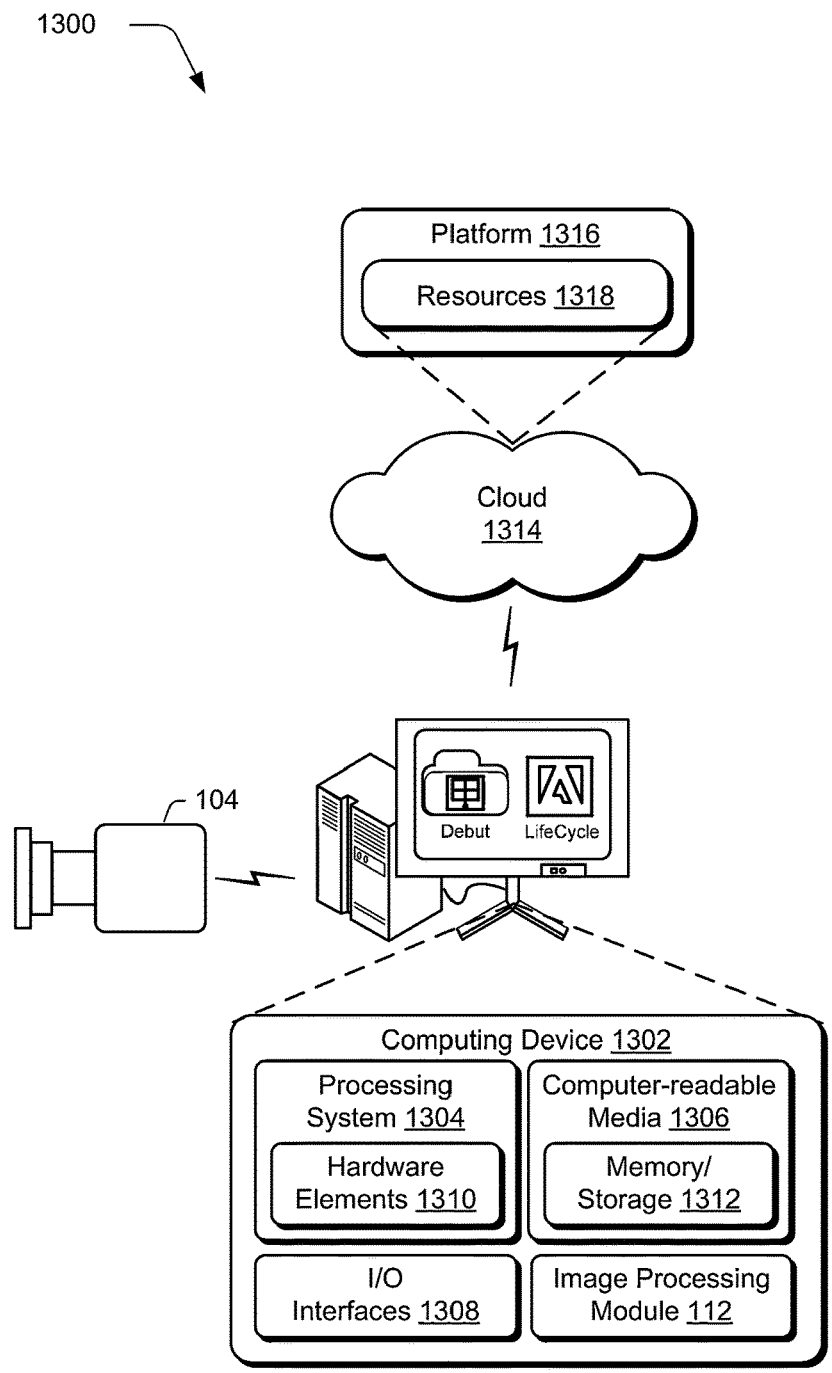
FIG. 13 illustrates an example system including various components of an example device that can be implemented as any type of computing device as described and/or utilize with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. This is illustrated through inclusion of the image processing module 118, which may be configured to process image data, such as image data captured by an image capture device 104. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1313 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices to edit a target image, the method comprising:
  selecting, for each respective pixel of a plurality of pixels comprising the target image, a respective mask from a plurality of masks, wherein at least some selected masks are different for different respective pixels;
  applying each respective selected mask to a source patch corresponding to the respective selected mask to down-weight portions of the corresponding source patch having irrelevant content and to define portions of the corresponding source patch to be included in computations of a target patch;
  computing a target patch based, at least in part, on the plurality of pixels comprising the target image and the defined portions of corresponding source patches to be included in computations of the target patch, the computing including using a distance function to weight a distance between pixels of the source patch and pixels of the target patch by:
    subtracting a location of a respective pixel of the pixels of the source patch from a location of a respective pixel of the pixels of the target patch;
    squaring a difference determined by the subtracting; and
    multiplying the squared difference by a mask value; and
  editing the target image by including the target patch as part of the target image, wherein the target patch corresponds to a segment of the target image, the segment including a foreground segment and a background segment.

2. A method as described in claim 1, wherein the plurality of masks are included as part of a set of preconfigured masks and the computing further includes selecting an appropriate one of the plurality of masks and a corresponding nearest neighbor field.

3. A method as described in claim 1, wherein the selecting from the plurality of masks is based on one or more local properties of the corresponding source patch.

4. A method as described in claim 3, wherein the selecting is performed using rules learned automatically from one or more samples or tuned manually.

5. A method as described in claim 1, wherein the source patch is a nearest neighbor field.

6. A method as described in claim 1, wherein the editing of the target image includes image-based rendering, hole-filling, texture synthesis, retargeting and reshuffling, super resolution, morphing, image compositing and interpolation, video summarization, or high dynamic range (HDR) reconstruction.

7. A method implemented by one or more computing devices to compute a target patch, the method comprising:

performing a patch search for each of a plurality of masks to calculate a corresponding plurality of nearest neighbor fields (NNFs), calculation of the corresponding plurality of nearest neighbor fields (NNFs) based on an optimization of coherence patch based energy terms;

selecting, for each respective pixel of a plurality of pixels comprising a target image, a respective mask from the plurality of masks and the nearest neighbor field corresponding to the respective selected mask, wherein at least some selected masks are different for different respective pixels; and computing the target patch, the target patch comprising pixels having colors, the colors of pixels comprising the target patch computed based on the respective selected masks and corresponding nearest neighbor fields, the computing including using a distance function to weight a distance between pixels of the source patch and pixels of the target patch by:

subtracting a location of a respective pixel of the pixels of the source patch from a location of a respective pixel of the pixels of the target patch;

squaring a difference determined by the subtracting; and multiplying the squared difference by a mask value.

8. A method as described in claim 7, wherein the performing of the patch search is performed in a region of an image that does not include the target image.

9. A method as described in claim 7, further comprising editing the target image using the target patch by performing one or more of image-based rendering, hole-filling, texture synthesis, retargeting and reshuffling, super resolution, morphing, image compositing and interpolation, video summarization, or HDR reconstruction.

10. A system comprising:

one or more computing devices configured to perform operations to edit a target image, the operations comprising:

selecting, for each respective pixel of a plurality of pixels comprising the target image, a respective mask from a plurality of masks, wherein some selected masks are different for different respective pixels, the plurality of masks including non-center masks;

applying each respective selected mask to a source patch corresponding to the respective selected mask to down-weight portions of the corresponding source patch having irrelevant content and to define portions of the corresponding source patch to be included in computations of a target patch, the down-weighting including computing scores for the non-center masks by:

determining a sum of multiple patch edge image values for respective pixels included in each of the respective selected masks multiplied by a mask value for the respective pixels included in each of the respective selected masks; and dividing the sum of the multiple patch edge image values multiplied by the mask values by another sum of the multiple patch edge image values;

computing a target patch based, at least in part, on the plurality of pixels comprising the target image and the defined portions of corresponding source patches to be included in computations of the target patch; and editing the target image by including the target patch as part of the target image, wherein the target patch corresponds to a segment of the target image, the segment being a foreground segment or a background segment.

11. A system as described in claim 10, wherein said computing comprises using a distance to weight a distance between the source patch and the target patch at every pixel.

12. A system as described in claim 10, wherein the corresponding source patch is a nearest neighbor field.

13. A system as described in claim 12, wherein a pixel color of a target patch is computed using the respective selected mask and the corresponding source patch.

14. A system as described in claim 10, wherein the editing of the target image includes image-based rendering, hole-filling, texture synthesis, retargeting and reshuffling, super resolution, morphing, image compositing and interpolation, video summarization, or high dynamic range (HDR) reconstruction.

15. A system as described in claim 10, wherein the plurality of masks are included as part of a set of preconfigured masks.

16. A system as described in claim 10, wherein the selecting from the plurality of masks is based on one or more local properties of the corresponding source patch.

17. A system as described in claim 16, wherein the selecting is performed using rules learned automatically from one or more samples or tuned manually.

18. A system as described in claim 10, wherein the operations further comprise assigning one of the non-center masks to one of the respective pixels responsive to the one of the non-center mask scores being greater than a threshold amount, otherwise assigning a center mask to the one of the respective pixels.

* * * * *